United States Patent [19]

Martineau et al.

[11] Patent Number: 5,054,037

[45] Date of Patent: Oct. 1, 1991

[54] METHOD OF SERVO-CONTROLLING THE PARAMETERS OF A MODULATOR HAVING $2^n$ PHASE AND AMPLITUDE STATES, AND A CIRCUIT FOR IMPLEMENTING THE METHOD

[75] Inventors: Didier Martineau, Conflans Sainte Honorine; Robert Ravoalavoson, Courbevoie, both of France

[73] Assignee: Alcatel N.V., Amsterdam, Netherlands

[21] Appl. No.: 465,731

[22] Filed: Jan. 18, 1990

[30] Foreign Application Priority Data

Jan. 19, 1989 [FR] France .............................. 89 00596

[51] Int. Cl.$^5$ .............................................. H03C 1/06
[52] U.S. Cl. ..................................... 375/60; 332/103; 332/107; 375/39
[58] Field of Search .............................. 375/39, 42, 60; 455/116, 126; 332/103, 107, 159, 160, 161, 162; 330/149

[56] References Cited

U.S. PATENT DOCUMENTS

| | | | |
|---|---|---|---|
| 4,291,277 | 9/1981 | Davis et al. | 375/60 |
| 4,462,001 | 7/1984 | Girard | 375/60 |
| 4,908,840 | 3/1980 | Kakimoto | 375/60 |
| 4,930,141 | 5/1990 | Ohmagari | 375/60 |

FOREIGN PATENT DOCUMENTS 2173074 10/1986 United Kingdom .

OTHER PUBLICATIONS

Brown et al.: "Fault Detection in Digital Microwave Radio Equipment"; *IEEE J. Selected Areas in Communications*, vol. 6, No. 5 (Jun. 1988) pp. 819–827.

Primary Examiner—Benedict V. Safourek
Attorney, Agent, or Firm—Christie, Parker & Hale

[57] ABSTRACT

Servo-controlling position in a modulator having $2^n$ phase and amplitude states (used for e.g. 16-QAM radio beam transmission) is achieved by monitoring the amplitude of the signal output from the modulator. In a first or inner loop, any constellation centering error in the modulation states is corrected; in a second or middle loop, any quadrature error between the modulated carriers is corrected; and in a third or outer loop, any amplitude difference between the X and Y channels input to the modulator is corrected.

6 Claims, 4 Drawing Sheets

METHOD OF SERVO-CONTROLLING THE PARAMETERS OF A MODULATOR HAVING $2^n$ PHASE AND AMPLITUDE STATES, AND A CIRCUIT FOR IMPLEMENTING THE METHOD

The invention relates to a method of servo-controlling the parameters of a modulator having $2^n$ phase and amplitude states, and to a circuit for implementing the method.

The invention relates more particularly to a method of servo-controlling constellation centering, quadrature, and amplitude on the X and Y channels of the modulator.

With $2^n$ state modulation, which is combined amplitude and phase modulation, if it is desired to provide a coordinate-type representation in signal space, the states may be uniformly distributed relative to axes corresponding to orthogonal X and Y carriers. This provides a constellation in which carrier states can be represented by respective vectors whose projections on the X and Y axes specify the coordinates of the ends of the vectors.

However, it can happen that such a constellation is off-center relative to these axes of symmetry, and/or phase shifted relative to these axes of symmetry, and/or that the amplitudes of the X and Y channels are different. This can degrade transmitter performance when the field concerned is constituted by radio beams, for example.

In prior art circuits, gain regulation and offset regulation of the modulating trains, and also phase shifting for adjusting carrier quadrature are all performed manually. Such adjustments are therefore of uncertain validity.

Firstly, if there is a temperature gradient, the components constituting the various blocks are subject to drift in their characteristics.

Secondly, particularly at microwave frequencies, the operating range on either side of an oscillator frequency is very small.

The object of the invention is to mitigate these drawbacks.

To this end, the invention provides a method of servo-controlling position in a modulator having $2^n$ phase and amplitude states, the method being characterized in that it comprises in succession:

a stage in which the amplitude of the signal output from the modulator is detected;

a stage in which a constellation centering error in said states is corrected;

a stage in which a quadrature error between the modulated carriers is corrected; and a stage in which an amplitude difference between the X and Y channels input to the modulator is corrected.

The invention also provides a circuit comprising a detector, an analog-to-digital converter followed by a control unit which receives the input trains and which delivers control signals, if necessary, i.e. respectively: an X channel offset signal DX; a Y channel offset signal DY; an X channel amplitude control signal AX; a Y channel amplitude control signal AY; and a quadrature angle control signal AQ.

Such a circuit in accordance with the invention provides many advantages, in particular it enables the constellation to be centered automatically, it enables quadrature to be regulated automatically, and it enables the amplitude on the two input channels of the modulator to be regulated automatically. No further adjustment is required and temperature drift is not to be feared.

Further characteristics and advantages of the invention appear from the following description given by way of non-limiting example and made with reference to the accompanying figures, in which.

Figure 1:
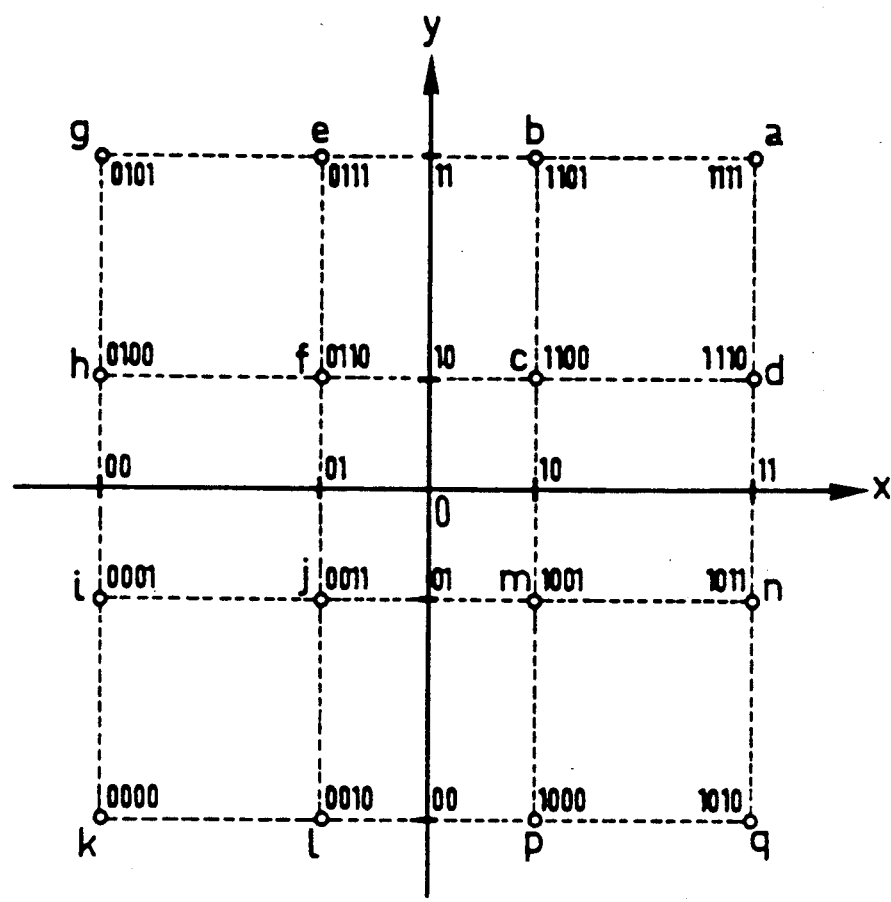
FIG. 1 shows the state constellation of a 16-QAM type modulator.

Throughout the description below, a 16-state quadrature amplitude modulation (16-QAM) type modulator is taken as an example and its constellation of states is shown in FIG. 1.

Figure 2:
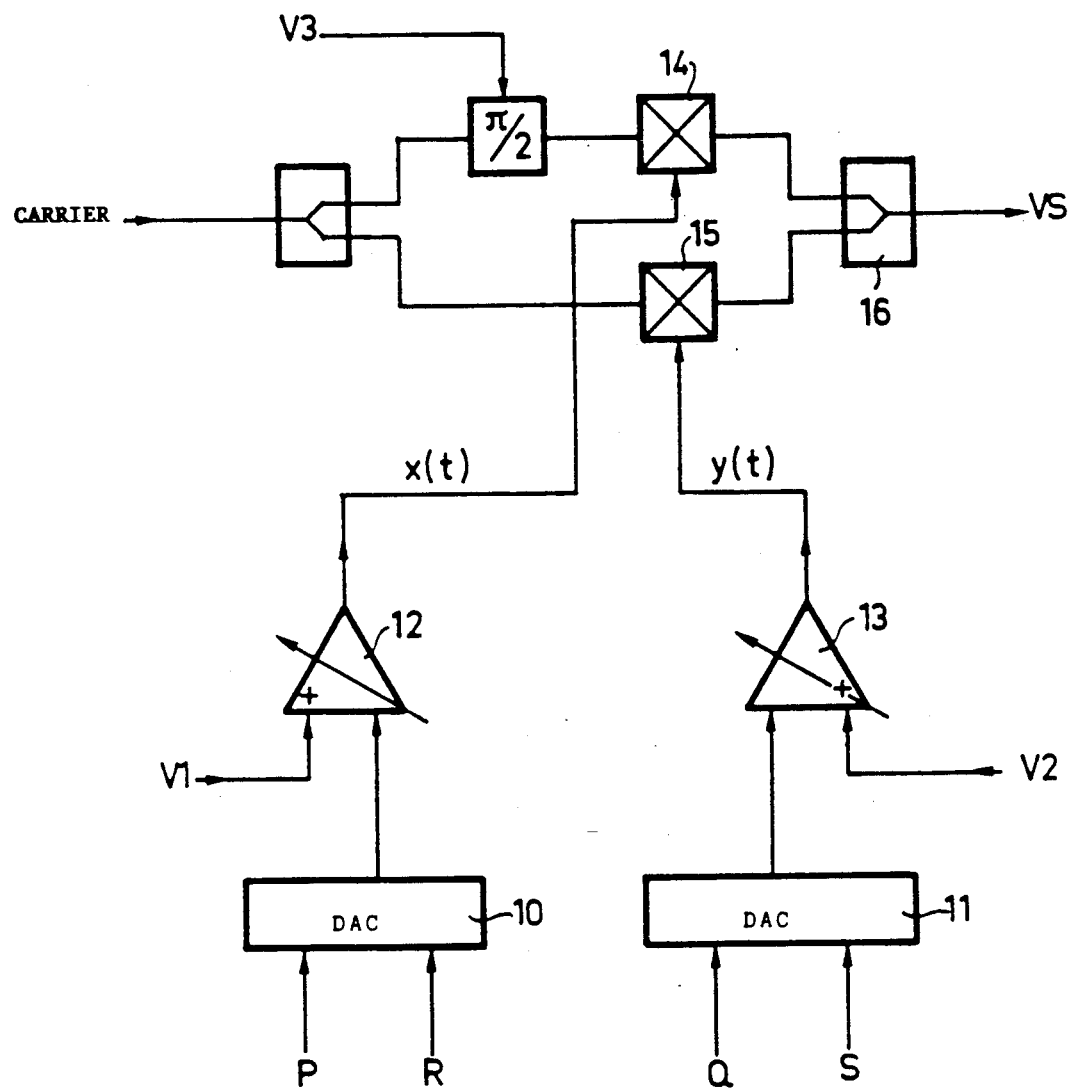
FIG. 2 shows a prior art modulator.

In such a prior art modulator, as shown in FIG. 2, four binary trains P, R, Q, and S are input in pairs to two digital-to-analog converters 10 and 11 whose outputs are applied to the inputs of two respective variable gain amplifiers 12 and 13 which respectively receive control voltages $V_1$ and $V_2$ on respective other inputs.

The output signals from these amplifiers 12 and 13 constitute two four-level trains X(t) and Y(t) which are applied to two mixers 14 and 15 each of which receives a carrier via its other input, said carriers being phase shifted by $\pi/2$ relative to each other. The phase shift angle may be adjusted by means of a voltage $V_3$. The output VS from an adder 16 is modulated with $2^n$ phase and amplitude states, and these states (constellation) are shown in FIG. 1 by small circles. In the example shown the modulation is 16 state modulation.

In this case, the constellation is centered: i.e. the projections onto the two axes of the vectors corresponding to opposite pairs of the various states are at the same amplitude and in phase opposition.

By detecting the amplitude of the signal leaving the modulator (or even the transmitter) it is possible to compare the various transmitted amplitudes, and judicious control can then be applied to a servo-control loop for each parameter to be corrected.

The sequential order in which corrections are performed is imposed by the validity of the information provided by such detection. The sequence is as follows:

correcting a constellation centering error;

correcting a quadrature error between the modulated carriers; and correcting an amplitude difference between the two channels.

Such a constellation can be off-centered in eight different ways:

upwards;

downwards;

to the right;

to the left;

up and to the right;

up and to the left;

down and to the right; and down and to the left.

By paying attention to the modulus only of the vectors, the direction in which the constellation is off-centered is determined using Table I at the end of the description. The vectors concerned are $\vec{Oa}$, $\vec{Ok}$, $\vec{Og}$, and $\vec{Oq}$, and the modulus of the vector $\vec{Oa}$ is written A, the modulus of the vector $\vec{Ok}$ is written K, the modulus of the vector $\vec{Og}$ is written G, and the modulus of the vector $\vec{Oq}$ is written Q.

Once the constellation is centered, there may be a quadrature error on the phase difference between the two carriers, and there may also be an amplitude difference between X modulation and Y modulation. The constellation is then phase shifted through an angle $\delta\phi$ relative to its axes of symmetry. In order to correct quadrature, Table II at the end of the description is used, with the vectors concerned being the vectors $\vec{Oa}$, $\vec{Og}$, $\vec{Ok}$, and $\vec{Oq}$ of the constellation (of modulus A, G, K, and Q).

If there is an amplitude difference between the X and Y channels, assuming the constellation to be centered and the carriers to be in quadrature, the relative amplitude difference between the X and Y channels can be determined and its direction can be determined by analyzing the constellation vectors $\vec{Ob}$, $\vec{Oe}$, $\vec{Ol}$, $\vec{Op}$, $\vec{Od}$, $\vec{Oh}$, $\vec{On}$, and $\vec{Oi}$ (of modulus B, E, L, P, D, H, N, and I), using Table III.

Figure 3:
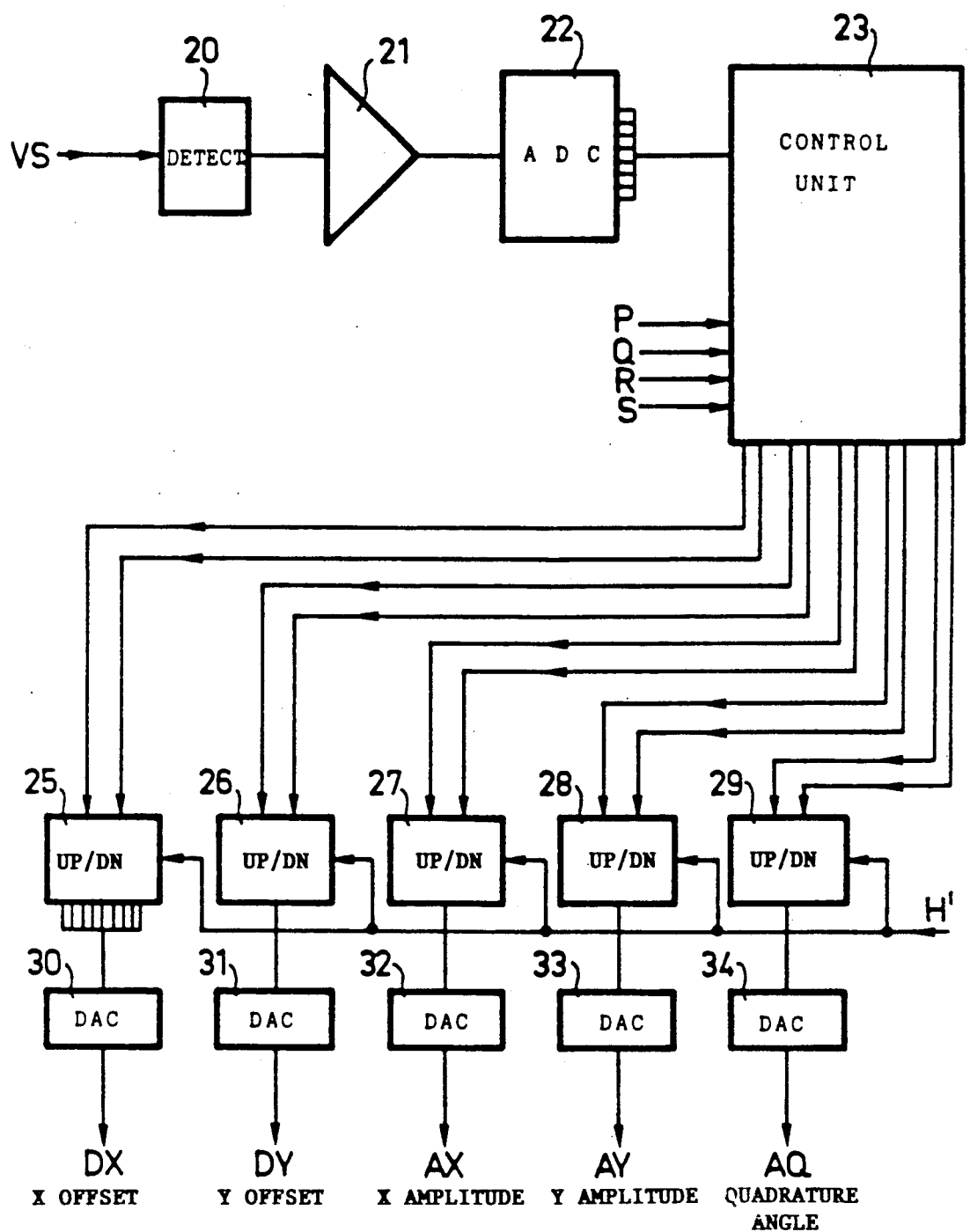
FIG. 3 shows a circuit implementing the method of the invention.

As shown in FIG. 3, the circuit for implementing the method comprises a detector 20 receiving the output signal VS from the modulator, an amplifier 21, an analog-to-digital converter 22 followed by a control unit 23 which may be constituted, for example, by a microprocessor or by a hard-wired logic unit, and which receives the four trains P, Q, R, and S as inputs for 16-state QAM modulation, and which delivers output signals. These signals are applied respectively to five up/down counters 25, 26, 27, 28, and 29 followed by five respective digital-to-analog converters 30, 31, 32, 33, and 34 so as to generate an X channel offset signal DX, a Y channel offset signal DY, an X channel amplitude control signal AX, a Y channel amplitude control signal AY, and a quadrature angle control signal AQ.

After being detected, the signal VS is converted into digital data (e.g. on 8 bits). This value is proportional to the modulus of each measured vector and it is applied on a permanent basis to the data bus of the microprocessor 23, for example, which takes account of it only when it relates to a point of interest (determined by an enable signal encoded on the basis of the four trains P, Q, R, and S, assuming 16-QAM modulation).

Figure 4:
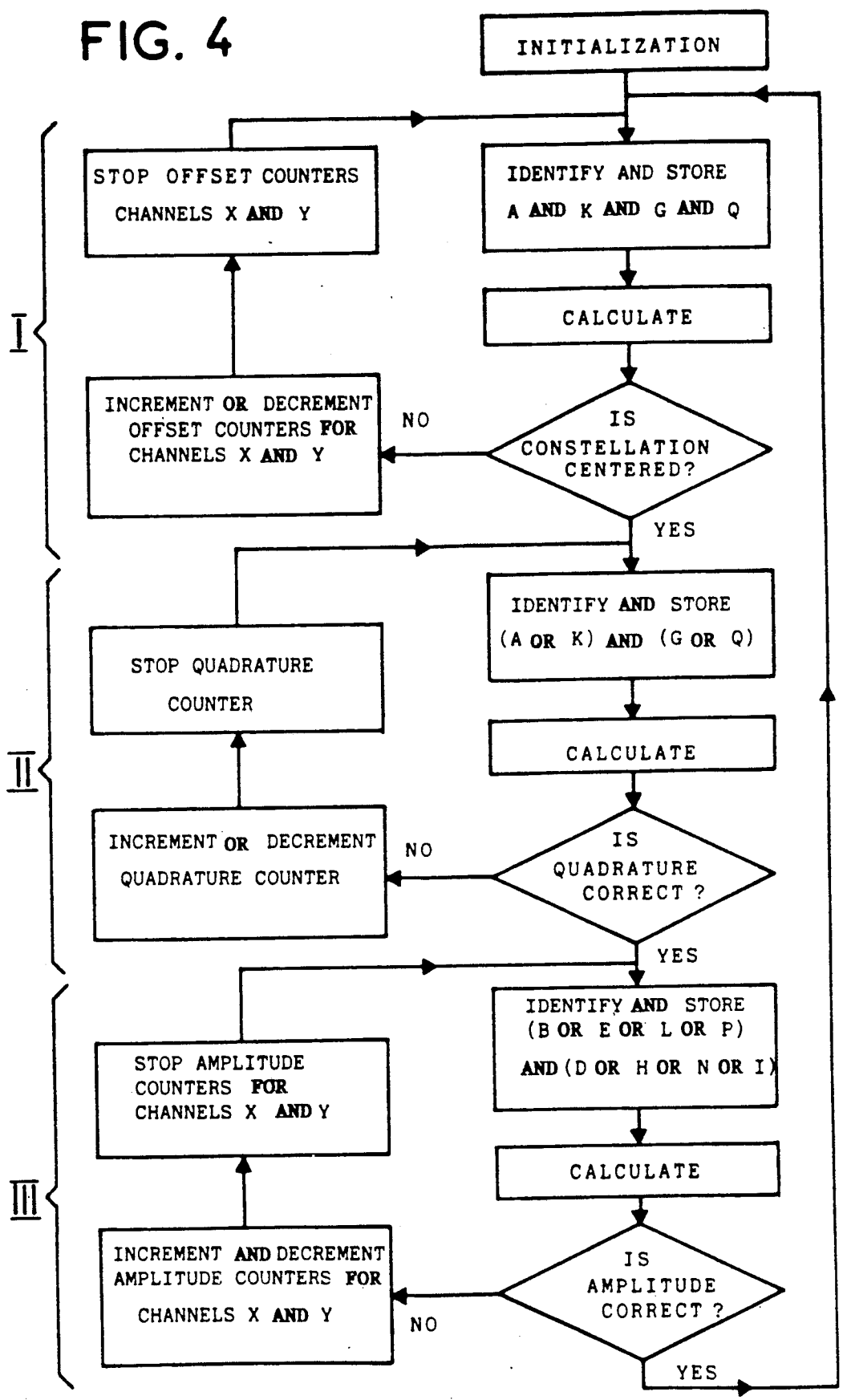
FIG. 4 is a flow chart illustrating the method of the invention.

The method of the invention is summarized in the flow chart of FIG. 4 which begins with an initialization phase and which is followed by three successive stages I, II, and III.

In the initialization stage, the system sets all of the output voltages from the digital-to-analog converters to a predetermined mean value. After this initialization stage, the method of the invention runs as follows:

Constellation Centering First Stage (I)

When values of interest, namely A, K, G, and Q are acquired, the circuit switches to calculation mode and determines the corrections that may need to be applied in accordance with the indications given in Table I.

Once this has been done, an X channel offset up/down counter (DX) and a Y channel offset up/down counter (DY) are incremented and/or decremented, and are then stopped after a length of time has elapsed proportional to the modulus of the error.

The up/down counters are driven by a slow clock H' which defines the speed and the passband of the loop.

The digital value output from the up/down counter under consideration (25 or 26) is transformed by the corresponding digital-to-analog converter (30 or 31) into a voltage (DX or DY) that replaces the offset voltage ($V_1$ or $V_2$) which is set manually in the prior modulator as shown in FIG. 2.

The loop is repeated until a "zero error" indication is obtained, which means that the constellation has been centered, after which the circuit moves on to the second stage.

Quadrature Fault Correcting Second Stage (II)

When values of interest, namely A or Q; and K or G are acquired, the circuit switches to calculation mode and determines the corrections that may need to be performed in accordance with the indications of Table II.

When this has been done, the quadrature correction up/down counter 29 is incremented or decremented and then stopped after a length of time has elapsed which is proportional to the modulus of the error.

This up/down counter is driven by a slow clock H' which defines the speed and the passband of the loop.

The digital value at the output from the up/down counter 29 is transformed by a digital-to-analog converter 34 into a voltage AQ which replaces the manual quadrature adjustment voltage $V_3$ in the prior art modulator as shown in FIG. 2.

This loop is repeated until a "zero error" indication is obtained corresponding to a constellation that has no quadrature error, after which the circuit moves on to the third stage.

Interchannel Amplitude Difference Correcting Third Stage (III)

When values of interest are acquired, i.e. B or E or L or P; and D or H or N or I, the circuit switches to calculation mode and determines possible corrections to be performed in accordance with the indications of Table III.

Once this has been done, an X channel amplitude up/down counter 27 and a Y channel amplitude up/down counter 28 are incremented and/or decremented and then stopped after a length of time has elapsed which is proportional to the modulus of the error.

The up/down counters are driven by a slow clock H' which defines the speed and the passband of the loop.

The digital value output from each up/down counter (27, 28) is transformed by a digital-to-analog converter (32, 33) into a voltage (AX, AY) which replaces the manual gain control adjustment of the amplifiers 12 and 13 in the prior art modulator as shown in FIG. 2.

The loop is repeated until a "zero error" indication is obtained, which corresponds to a constellation having no amplitude difference between its X and Y channels.

Once all three correction loops have operated, the constellation is "perfect".

Naturally, the present invention has been described and shown merely by way of preferred example, and its component parts could be replaced by equivalent items without thereby going beyond the scope of the invention.

TABLE I

| possible cases | off-centering | corrective action |
| --- | --- | --- |
| A > K and G > Q | upwards | offset < 0 on channel Y |
| A > K and G = Q | up + right | offset < 0 on X and Y |
| A > K and G < Q | to the right | offset < 0 on channel X |
| A < K and G > Q | to the left | offset > 0 on channel X |
| A < K and G = Q | down + left | offset > 0 on X and Y |
| A < K and G < Q | downwards | offset > 0 on channel Y |
| A = K and G > Q | up + left | offset > 0 on channel X / offset < 0 on channel Y |
| A = K and G < Q | down + left | offset < 0 on channel X |

TABLE I-continued

| possible cases | off-centering | corrective action |
|---|---|---|
| | | offset > 0 on channel Y |
| A = K and G = Q | centered | no action |

TABLE II

| possible cases | corresponding error | corrective action | summary |
|---|---|---|---|
| A > G or A > Q or K > G or K > Q | $\delta\phi < 0$ | increase $\delta\phi$ | A + K > G + Q |
| A < G or A < Q or K < G or K < Q | $\delta\phi > 0$ | reduce $\delta\phi$ | A + K < G + Q |
| A = G or A = Q or K = G or K = Q | $\delta\phi = 0$ | no action | A + K = G + Q |

TABLE III

| possible cases | amplitude error | correction action |
|---|---|---|
| B + E + L + P > D + H + N + I | Y channel amplitude > X channel amplitude | Y channel amplitude ↓ and X channel amplitude ↑ |
| B + E + L + P < D + H + N + I | Y channel amplitude < X channel amplitude | Y channel amplitude ↑ and X channel amplitude ↓ |
| B + E + L + P = D + H + N + I | no error | no action |

We claim:

1. A method of servo-controlling position in a modulator having at least four phase states and at least four amplitude states, the method comprising the steps of:
   detecting the respective amplitudes of the signal output from the modulator for each point in the output signal constellation defined by said four phase states and said four amplitude states;
   first correcting any constellation centering error in based on the amplitudes of the uncorrected output signal;
   then, after any such constellation centering error has been thus corrected, correcting any quadrature error between the modulated carriers based on the amplitudes of the thus-centered output signal; and
   then, after any such quadrature error has been thus corrected, correcting any amplitude difference between the X and Y channels input to the modulator based on the amplitudes of the thus-centered and phase-corrected output signal.

2. A method according to claim 1, wherein the output signal from the modulator after detection is converted into a digital data stream representative of the modulus of each measured vector in said constellation which is continuously applied to an input terminal of an associated control unit control unit which takes account thereof only when it applies to a point of interest.

3. A method according to claim 1, wherein each said correcting step further comprises:
   digitally acquiring the values of interest,
   calculating a correction value, and
   obtaining an analog control value from the thus-calculated correction value by up/down counting followed by digital-to-analog conversion, and
   said correction steps are sequentially performed in a loop until the detected error is zero.

4. A circuit for servo-controlling position in a QAM modulator having $2^n$ phase and amplitude states, said circuit comprising
   a detector;
   an analog-to-digital converter responsive to an analog output signal from the detector; and
   a control unit responsive to digital input trains from the converter, wherein
   said control unit delivers
      an X channel offset signal,
      a Y channel offset signal,
      an X channel amplitude control signal,
      a Y channel amplitude control signal, and
      a quadrature angle control signal,
   said control unit further comprises
      first means for measuring and correcting any amplitude difference between the X and Y channels input to the modulator, said first means further comprising
      second means for measuring and correcting any quadrature error between the modulated carriers prior to any correction of said amplitude difference, said second means further comprising
      third means for correcting any constellation centering error in the thus-detected amplitudes of said output signal prior to any correction of said quadrature error.

5. A circuit according to claim 4, wherein each of the control signals is input to an up/down counter followwed by a digital-to-analog converter.

6. A circuit according to claim 5, wherein the up/-down counters are driven by a slow clock which defines the speed and the passband of the loop.

* * * * *

UNITED STATES PATENT AND TRADEMARK OFFICE
CERTIFICATE OF CORRECTION

PATENT NO. : 5,054,037
DATED     : October 1, 1991
INVENTOR(S) : Didier Martineau; Robert Ravoalavoson It is certified that error appears in the above-identified patent and that said Letters Patent is hereby corrected as shown below:

Column 5, line 51, after "error" delete "in".

Column 6, line 1, delete "control unit" (second occurrence).

Column 6, lines 63,64, change "followwed" to
       -- followed --.

Signed and Sealed this

First Day of February, 1994

Attest:

BRUCE LEHMAN

*Attesting Officer*     Commissioner of Patents and Trademarks